US006999118B2

(12) United States Patent
Suzuki

(10) Patent No.: US 6,999,118 B2
(45) Date of Patent: Feb. 14, 2006

(54) METHOD FOR DRIVING SOLID-STATE IMAGING PICKUP DEVICE AT A VARIABLE FRAME RATE AND CAMERA

(75) Inventor: Ryoji Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 130 days.

(21) Appl. No.: 10/182,056

(22) PCT Filed: Nov. 27, 2001

(86) PCT No.: PCT/JP01/10316

§ 371 (c)(1),
(2), (4) Date: Oct. 18, 2002

(87) PCT Pub. No.: WO02/43376

PCT Pub. Date: May 30, 2002

(65) Prior Publication Data
US 2003/0107664 A1    Jun. 12, 2003

(30) Foreign Application Priority Data
Nov. 27, 2000  (JP) .............................. 2000-359739

(51) Int. Cl.
*H04N 9/73* (2006.01)
(52) U.S. Cl. .................. 348/226.1; 348/296; 348/297; 348/364; 382/274
(58) Field of Classification Search ................ 348/362, 348/226.1, 222.1, 366, 296, 297, 364; 382/274
See application file for complete search history.

(56) References Cited

U.S. PATENT DOCUMENTS

| 4,670,787 A | * | 6/1987 | Levine ........................ 348/602 |
| 5,053,871 A | * | 10/1991 | Ogawa et al. .............. 348/366 |
| 5,239,369 A | * | 8/1993 | Suzuki .................... 348/226.1 |
| 5,272,539 A | * | 12/1993 | Kondo ..................... 348/229.1 |
| 5,384,595 A | * | 1/1995 | Sakaguchi ............. 348/208.99 |
| 5,960,153 A | * | 9/1999 | Oster et al. ................. 386/117 |
| 6,271,884 B1 | * | 8/2001 | Chung et al. ............... 348/370 |
| 6,295,085 B1 | * | 9/2001 | Munson et al. .......... 348/226.1 |
| 6,519,002 B1 | * | 2/2003 | Tomaszewski ........... 348/226.1 |

FOREIGN PATENT DOCUMENTS

| JP | 2000-224489 | 8/2000 |
| JP | 2001-257931 | 9/2001 |

* cited by examiner

*Primary Examiner*—Ngoc-Yen Vu
*Assistant Examiner*—Gary C. Vieaux
(74) *Attorney, Agent, or Firm*—Sonnenschein, Nath & Rosenthal LLP

(57) ABSTRACT

The present invention relates to a method for driving a solid-state image pickup device and a camera provided with the driving function. In the method for driving the solid-state image pickup device and the camera according to the present invention, the frame rate of the image pickup device is varied according to the frequency of illumination or the brightness. Alternatively, the frame rate of the image pickup device is varied and an electronic shutter is driven at the same time according to the brightness. Consequently, it is possible to suppress occurrence of flicker and give a liberal brightness condition under which an image can be picked up.

1 Claim, 1 Drawing Sheet

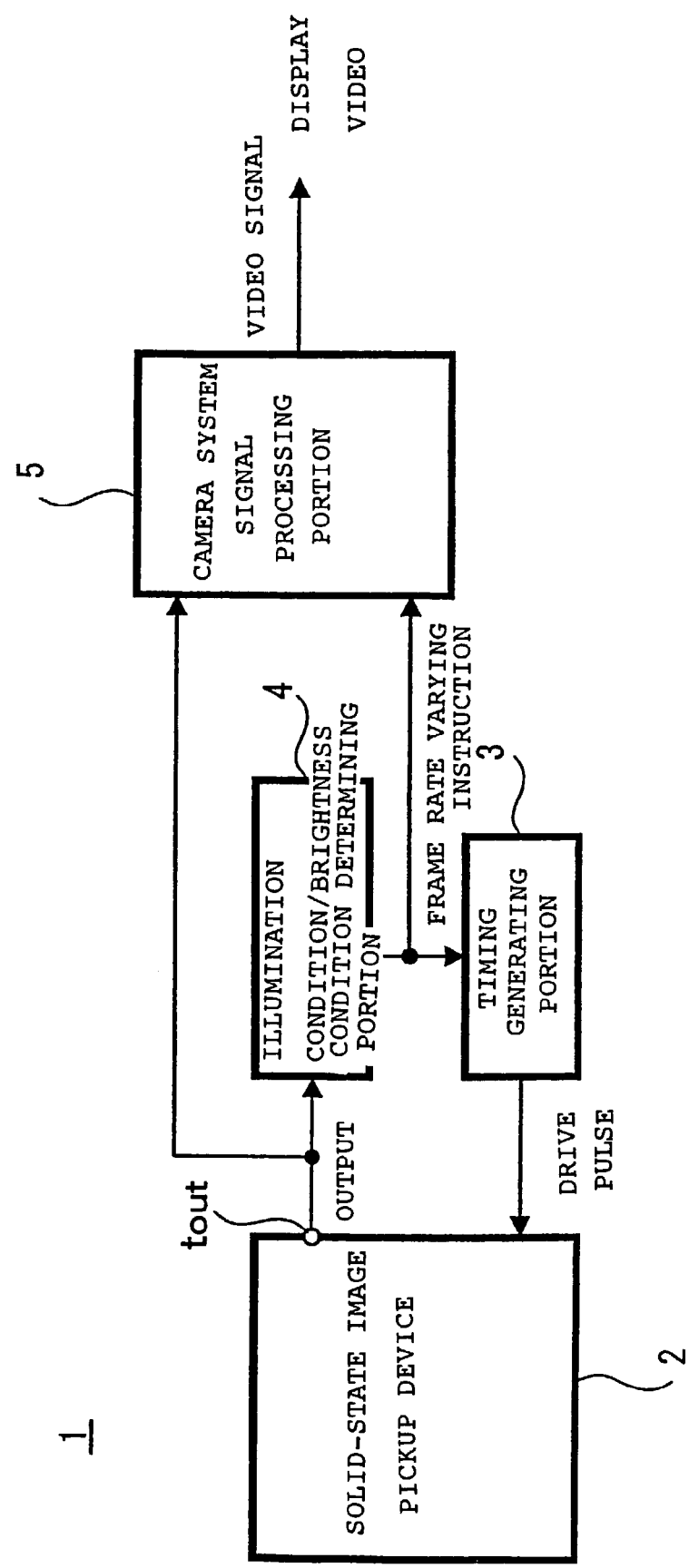

METHOD FOR DRIVING SOLID-STATE IMAGING PICKUP DEVICE AT A VARIABLE FRAME RATE AND CAMERA

BACKGROUND OF THE INVENTION

The present invention relates to a method for driving a solid-state image pickup device and a camera provided with the driving function.

BACKGROUND ART

There has been known that flicker occurs when a moving picture is picked up under the illumination of a fluorescent lamp by using a camera provided with a solid-state image pickup device. That is to say, the frequency of the fluorescent lamp depends upon regions: for example, 50 Hz in the east region while 60 Hz in the west region in Japan. In the meantime, a frame rate is fixed in a conventional TV system: for example, 60 field/s and 30 frame/s in an NTSC system while 50 field/s and 25 frame/s in a PAL system. Consequently, when the moving picture is picked up under the illumination of the fluorescent lamp at a field rate other than 2 A/n (wherein A designates the frequency of the fluorescent lamp; and n is 1, 2, 3, 4, . . . ), flicker occurs. In order to reduce such flicker, an electric charge has been conventionally discarded by releasing an electronic shutter of 2 A/n, so that an electric charge storage time has been made to accord with the flicker.

Furthermore, the electric charge has been conventionally discarded by rapidly releasing an electronic shutter in an image pickup camera not provided with an optical diaphragm in picking up an image at a bright position, thereby adjusting light quantity so as to enter a dynamic range of a solid-state image pickup device.

As described above, in either of countermeasures against the flicker and the light quantity adjustment for the image pickup camera provided with the solid-state image pickup device, the image picking-up condition has been made to accord with the illumination by conventionally discarding the electric charge at a fixed frame rate.

SUMMARY OF THE INVENTION

The present invention provides a method for driving a solid-state image pickup device which makes it possible for an optelectrically converted charge to effectively be utilized without being discarded so as to cope with the flicker under the illumination and adjust the brightness at an image pickup position, and a camera provided with the driving function.

In a method for driving a solid-state image pickup device according to the present invention, a frame rate of an image pickup device is varied according to the frequency of illumination. According to the present invention, since the frame rate of the image pickup device is varied according to the frequency of illumination, flicker can be eliminated or alleviated without discarding an optoelectrically converted charge.

In a method for driving a solid-state image pickup device according to the present invention, a frame rate of an image pickup device is varied according to the brightness. According to the present invention, since the frame rate of the image pickup device is varied according to the outdoor brightness or the brightness of illumination in a room, light quantity can be adjusted without discarding an optoelectrically converted charge. Namely, it is possible to expand illumination conditions capable of picking up an image.

In a method for driving a solid-state image pickup device according to the present invention, a frame rate of an image pickup device is varied and an electronic shutter is driven at the same time according to the brightness. According to the present invention, since the variations in the frame rate of the image pickup device is combined with the electronic shutter according to the brightness at an image pickup position, the illumination condition capable of picking up an image can be further made liberal.

A camera according to the present invention has the function of varying a frame rate of a solid-state image pickup device according to the frequency of illumination. Since the camera according to the present invention has the function of varying the frame rate of the solid-state image pickup device according to the frequency of illumination, a moving picture in which flicker can be eliminated or alleviated can be picked up without discarding an optoelectrically converted charge.

A camera according to the present invention has the function of varying a frame rate of a solid-state image pickup device according to the brightness. Since the camera according to the present invention has the function of varying the frame rate of the solid-state image pickup device according to the outdoor brightness or the brightness of illumination in a room, an image can be picked up under a wide range of illumination conditions from a bright state to a dark state without discarding an optoelectrically converted charge.

A camera according to the present invention has the function of varying a frame rate of a solid-state image pickup device according to the brightness and the function of an electronic shutter. Since the camera according to the present invention has the function of varying the frame rate of the solid-state image pickup device according to the brightness and the function of the electronic shutter, an image can be picked up in an adjusted light quantity under a wide range of illumination conditions.

In the method for driving the solid-state image pickup device according to the present invention, it is possible to suppress occurrence of flicker (i.e., eliminate or alleviate flicker) due to the illumination without discarding any optoelectrically converted charge.

Furthermore, since light quantity can be adjusted by varying the frame rate according to the brightness, it is possible to give a wider range of conditions of the brightness in which the image can be picked up. That is to say, the image can be picked up within a wide range from a bright state to a dark state. When the electronic shutter function is used at the same time, it is possible to further give a wide range of conditions of the brightness in which the image can be picked up.

With the camera according to the present invention, it is possible to pick up the moving picture having a suppressed flicker without using any electronic shutter function.

Moreover, since the frame rate is varied according to the brightness, it is possible to pick up the image under a wide range of brightness conditions without discarding a optoelectrically converted charge. When the electronic shutter function is used at the same time, it is possible to pick up the image under a wider range of brightness conditions.

According to the present invention, measures against flicker and adjustment of the light quantity can be achieved by varying the frame rate without discarding an optoelectrically converted charge, it is possible to improve sensitivity with the measures against flicker, and further, to take a great quantity of information with the light quantity adjustment, so as to increase the frame rate when it is bright.

DETAILED DESCRIPTION OF THE PRESENTLY PREFERRED EMBODIMENTS

FIG. 1 is a block diagram illustrating an embodiment of a camera according to the present invention.

BEST MODE FOR CARRYING OUT THE INVENTION

A method for driving a solid-state image pickup device and an embodiment of a camera according to the present invention will be described hereinafter with reference to the accompanying drawing.

FIG. 1 illustrates an embodiment of a camera using a driving method according to the present invention. FIG. 1 illustrates the entire configuration of the camera.

A camera 1 in the embodiment comprises a solid-state image pickup device 2 such as a CCD image pickup device or a CMOS type image pickup device; a timing generating portion 3 for producing a drive pulse so as to drive the solid-state image pickup device 2; an illumination condition/brightness condition determining portion 4 for determining an illumination condition at an image pickup position (for example, the frequency of a fluorescent lamp, the light quantity or brightness of the illumination or the like), the outdoor brightness or the like; and a camera system signal processing portion 5.

In the camera 1, the solid-state image pickup device 2 is driven in response to a drive pulse output from the timing generating portion 3, and then, outputs an output signal in accordance with an image from an output terminal $t_{OUT}$. The output signal is input into the illumination condition/brightness condition determining portion 4. The illumination condition/brightness condition determining portion 4 detects the illumination state at an image pickup position, the outdoor brightness or the brightness in a room based on the output signal, and then, instructs the timing generating portion 3 on a frame rate of the solid-state image pickup device 2 in accordance with the detection result.

For example, the illumination condition/brightness condition determining portion 4 detects the frequency of the illumination, which may cause flicker, and then, instructs the timing generating portion 3 on a frame rate satisfying 2 A/n (wherein A designates the frequency of a fluorescent lamp; and n is 1, 2, 3 . . . ), which is a requirement for suppressing flicker. The frequency of the illumination can be detected on the basis of a period of a contrast in the entire image pickup region in the case of a CCD image pickup device while on the basis of the number of horizontal stripes representing the brightness in the case of a CMOS image pickup device.

Furthermore, the illumination condition/brightness condition determining portion detects the brightness, and then, instructs the timing generating portion 3 on a frame rate, at which the light quantity can be adjusted without discarding any electric charge. The brightness can be detected by detecting the area of a pixel in which the output signal from the solid-state image pickup device 2 is on a peak level.

The frame rate varying instruction from the illumination condition/brightness condition determining portion 4 in accordance with the illumination condition or the brightness condition is sent also to the camera system signal processing portion 5.

The timing generating portion 3, which has been instructed on the frame rate variation, produces a drive pulse according to the instructed frame rate, and then, sends the drive pulse to the solid-state image pickup device. The solid-state image pickup device is driven at the frame rate instructed via the drive pulse. The output signal from the solid-state image pickup device 2 is sent also to the camera system signal processing portion 5, to be converted into a video signal. To the camera system signal processing portion 5 is sent also the instruction of the frame rate from the illumination condition/brightness condition determining portion 4, as described above, and thus, information on the frame rate is added to the video signal. In this manner, a moving picture or the like can be favorably picked up under the illumination or outdoors. The video signal output from the camera system signal processing portion 5 is supplied to a required display or video.

In the present embodiment, when the image is picked up under the illumination of, for example, the fluorescent lamp, the illumination condition/brightness condition determining portion 4 detects the illumination state on the basis of the output signal from the solid-state image pickup device 2. If the illumination condition/brightness condition determining portion detects, for example, the frequency of the illumination which may cause flicker, the illumination condition/brightness condition determining portion 4 instructs the timing generating portion 3 to vary the frame rate to another frame rate at which the flicker can be suppressed, and consequently, the timing generating portion 3 supplies the drive pulse having the varied and instructed frame rate to the solid-state image pickup device 2. Thus, the solid-state image pickup device 2 can output the output signal with the flicker eliminated or alleviated.

Furthermore, when the illumination condition/brightness condition determining portion 4 detects whether a subject is in a bright state or in a dark state, the illumination condition/brightness condition determining portion 4 instructs the timing generating portion 3 to vary the frame rate to another frame rate according to the light quantity: for example, to increase the frame rate in an excessively bright state while to decrease the frame rate in a dark state. Consequently, the timing generating portion 3 supplies a drive pulse having the varied and instructed frame rate to the solid-state image pickup device 2. Thus, the solid-state image pickup device can output the output signal indicating the properly adjusted brightness.

As a consequence, in the camera 1 of the present embodiment, it is possible to pick up the moving picture from which the flicker can be eliminated or alleviated by allowing the frame rate of the solid-state image pickup device to satisfy the illumination condition without using any electronic shutter. Moreover, it is possible to set the image pickup condition while making full use of the dynamic range of the image pickup device by varying the frame rate of the solid-state image pickup device according to the brightness or darkness, thus giving a wide range of conditions of the brightness at which the image can be picked up (inclusive of the condition of the outdoor brightness and the condition of the brightness in a room). In other words, it is possible to enlarge the dynamic range.

In the present embodiment, it is possible to effectively utilize the optoelectrically converted charge without discarding any charge with the measures against flicker and the adjustment of light quantity. Therefore, in terms of the flicker measures, it is possible to enhance the sensitivity in comparison with the case of the use of the electronic shutter. In terms of the light quantity adjustment, it is possible to increase information which can be taken in so as to increase the frame rate when it is bright. Here, the upper limit of the frame rate depends upon a lower one out of the drive frequencies of the camera and the display or video.

Even at the upper limit of the frame rate, the light quantity can be adjusted in addition to the function of the electronic shutter under the condition that the brightness is saturated (also outdoors, under the illumination in a room), thus further giving the liberal condition of the brightness at which the image can be picked up (inclusive of the condition of the outdoor brightness and the condition of the brightness in a room).

Currently, there is generally a monitor or the like for a personal computer, provided with moving picture display means, in which a frame rate is arbitrarily selected. The method for driving the solid-state image pickup device or the camera in the present embodiment can be suitably applied to the case where a display provided with moving picture means capable of selecting an arbitrary frame rate is used, as described above.

What is claimed is:

1. A camera comprising:
    a solid-state image pickup device;
    a timing generating portion for producing a drive pulse to drive the solid-state image pickup device;
    an illumination condition/brightness condition determining portion for determining an illumination condition at an image pickup position; and
    a camera system signal processing portion,
    wherein the illumination condition/brightness condition determining portion detects an illumination state at the image pickup position, including a frequency of illumination that may cause flicker, and
    instructs the timing generating portion on a frame rate of the solid-state image pickup device in accordance with the detected illumination state, the instructed frame rate satisfying 2 A/n, where A designates the frequency of a light source illuminating the image pickup position and n is 1, 2, or 3, thus suppressing flicker,
    wherein the timing generating portion, which has been instructed on the frame rate, produces a drive pulse according to the instructed frame rate, and sends the drive pulse to the solid-state image pickup device, the solid-state image pickup device being driven at the frame rate instructed via the drive pulse, and
    wherein when the illumination condition/brightness condition determining portion detects whether a subject is in a bright state or in a dark state, the illumination condition/brightness condition determining portion instructs the timing generating portion to vary the frame rate to another frame rate according to a detected light quantity, the frame rate being increased responsive to a predetermined bright state and being decreased responsive to a predetermined dark state, the timing generating portion supplying the drive pulse having the varied frame rate to the solid-state image pickup device, the solid-state image pickup device outputting a signal adjusted for the detected light quantity.

* * * * *